(12) United States Patent
Sun et al.

(10) Patent No.: US 11,899,194 B2
(45) Date of Patent: Feb. 13, 2024

(54) MARGIN ASSESSMENT METHOD (71) Applicant: NATIONAL TAIWAN UNIVERSITY, Taipei (TW)

(72) Inventors: Chi-Kuang Sun, Taipei (TW); Yi-Hua Liao, Taipei (TW); Chia-I Chen, Taichung (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 365 days.

(21) Appl. No.: 17/505,709

(22) Filed: Oct. 20, 2021

(65) Prior Publication Data
US 2023/0044111 A1 Feb. 9, 2023

(30) Foreign Application Priority Data

Jul. 30, 2021 (TW) ................................ 110127987

(51) Int. Cl.
*G02B 21/36* (2006.01)
*G06T 7/00* (2017.01)
*G02B 21/00* (2006.01)
*G06N 3/045* (2023.01)

(52) U.S. Cl.
CPC ....... *G02B 21/367* (2013.01); *G02B 21/0064* (2013.01); *G06N 3/045* (2023.01); *G06T 7/0012* (2013.01); *G06T 2207/10056* (2013.01); *G06T 2207/20081* (2013.01); *G06T 2207/30096* (2013.01)

(58) Field of Classification Search
CPC .. G02B 21/367; G02B 21/0064; G06N 3/045; G06N 3/048; G06N 3/0455; G06N 3/0464; G06N 3/09; G06T 7/0012; G06T 2207/10056; G06T 2207/20081; G06T 2207/30096; G06T 2207/20084; G06T 2207/30088

See application file for complete search history.

(56) References Cited

U.S. PATENT DOCUMENTS

| 11,678,802 B2 * | 6/2023 | Coe ...................... A61B 5/0075 600/475 |
| 2007/0135999 A1 * | 6/2007 | Kolatt .................. G06V 20/695 702/19 |
| 2008/0015448 A1 | 1/2008 | Keely et al. |

(Continued)

FOREIGN PATENT DOCUMENTS

TW 201433296 A 9/2014

OTHER PUBLICATIONS

"A novel method for unsupervised image-to-image translation with a new attention module and a new normalization function"; Aug. 25, 2020; http://flyshare.xyz/2020/08/25/UGTIT%E7%AC%94%E8%AE%B0/.

(Continued)

*Primary Examiner* — Md K Talukder
(74) *Attorney, Agent, or Firm* — Li & Cai Intellectual Property (USA) Office (57) ABSTRACT A margin assessment method is provided. Under cooperation of harmonic generation microscopy (HGM) and a deep learning method, the margin assessment method can instantaneously and digitally determine whether a 3D image group generated by an HGM imaging system is a malignant tumor or the surrounding normal skin, so as to assist in determining margins of a lesion.

10 Claims, 6 Drawing Sheets

(56) References Cited

U.S. PATENT DOCUMENTS

| | | | |
|---|---|---|---|
| 2013/0066199 A1* | 3/2013 | Ramanujan | G01N 21/6428 |
| | | | 435/34 |
| 2014/0012104 A1 | 1/2014 | Chen et al. | |
| 2016/0110584 A1* | 4/2016 | Remiszewski | G06V 20/69 |
| | | | 382/133 |
| 2018/0239949 A1 | 8/2018 | Chander et al. | |
| 2019/0223728 A1* | 7/2019 | Heidari | G06V 10/82 |
| 2020/0364855 A1* | 11/2020 | Ha | G16H 50/30 |
| 2021/0375457 A1* | 12/2021 | LeBoeuf | G16H 50/20 |
| 2023/0044111 A1* | 2/2023 | Sun | G02B 21/0064 |
| 2023/0125377 A1* | 4/2023 | Gao | G01J 3/2823 |
| | | | 356/326 |

OTHER PUBLICATIONS

Zongwei Zhou, Vatsal Sodha, Jiaxuan Pang, Michael B. Gotway, and Jianming Liang, "Models Genesis"; Dec. 16, 2020; Medical Image Analysis, https://arxiv.org/abs/2004.07882.

* cited by examiner

MARGIN ASSESSMENT METHOD

CROSS-REFERENCE TO RELATED PATENT APPLICATION

This application claims the benefit of priority to Taiwan Patent Application No. 110127987, filed on Jul. 30, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a margin assessment method, and more particularly to a margin assessment method that utilizes non-linear harmonic generation microscopy in cooperation with a deep learning method.

BACKGROUND OF THE DISCLOSURE

Visually assessing certain skin cancers can be a difficult task. For example, Extramammary Paget's disease (EMPD) is often misdiagnosed as an inflammatory or infective skin condition due to its nonspecific clinical appearance. Compared with nonsurgical treatments, a complete surgical removal of a lesion is currently the best choice for treating EMPD.

However, in the conventional techniques, surgical margins of the lesion are difficult to be defined through clinical features of the lesion. Furthermore, in a lot of cases, the EMPD lesions have an ill-defined tumor border or an extended tumor spread that extends beyond a clinically visible tumor border. As such, physicians often have difficulty identifying accurate margins of resection and removing the lesion completely.

SUMMARY OF THE DISCLOSURE

In response to the above-referenced technical inadequacies, the present disclosure provides a margin assessment method that utilizes non-linear harmonic generation microscopy in cooperation with a deep learning method.

In one aspect, the present disclosure provides a margin assessment method, which includes: selecting a predetermined specimen region with a target lesion from skin of a subject; extracting, by using a harmonic generation microscopy (HGM) imaging system, a plurality of 3D image groups within a range from a surface of a plurality of positions in the predetermined specimen region to a predetermined depth, in which each of the 3D image groups includes a series of 2D images; obtaining and staining a plurality of pathological tissue sections from the predetermined specimen region; examining the plurality of pathological tissue sections to generate a plurality of pathological results and define a margin of the target lesion, using the plurality of pathological results as a plurality of standard examination results that are corresponding to the 3D image groups according to the plurality of positions, and labeling the 3D image groups to generate a plurality of labeled 3D image groups; pre-processing the plurality of labeled 3D image groups and dividing the plurality of labeled 3D image groups into a training set, a validation set, and a test set; fitting parameters of a deep learning model with the training set, predicting responses of the fitted deep learning model with the validation set, and then using the test set to evaluate whether a final model fitted with the training set meets a predetermined condition, in which the final model that meets the predetermined condition is taken as a margin assessment model; extracting, by using the HGM imaging system, a plurality of to-be-identified 3D image groups from a plurality of locations in a target region; and inputting the to-be-identified 3D image groups into the margin assessment model to generate assessment results.

Therefore, the margin assessment method provided by the present disclosure combines the nonlinear harmonic generation microscopy (HGM) with the deep learning method, so as to instantaneously and digitally determine whether the 3D image group generated by using the HGM is malignant EMPD or the surrounding normal skin. To demonstrate the margin assessment method provided by the present disclosure, in the embodiments of the present disclosure, 3D imaging of different locations of fresh EMPD surgical samples is performed from the surface to a depth of 180 μm by using a stain-free HGM. In the present disclosure, by conducting a subsequent histopathological examination of the same sample, the standard examination results are mapped to the 3D HGM image groups with labels, so as to train the deep learning model.

In the embodiments of the present disclosure, 2095 3D image groups are used as the training set and the validation set, and results of an EMPD and normal skin tissue classification can achieve 98.06% of sensitivity, 93.18% of specificity, and 95.81% of accuracy. Therefore, in the margin assessment method of the present disclosure, non-invasive real-time information of an imaged part can be provided, and the non-invasive real-time information is input into a trained 3D artificial intelligence model to indicate whether the imaged part is malignant or normal skin tissue based on the 3D image group and depth information of skin diseases, thereby assisting a user to map the EMPD margins with high accuracy.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
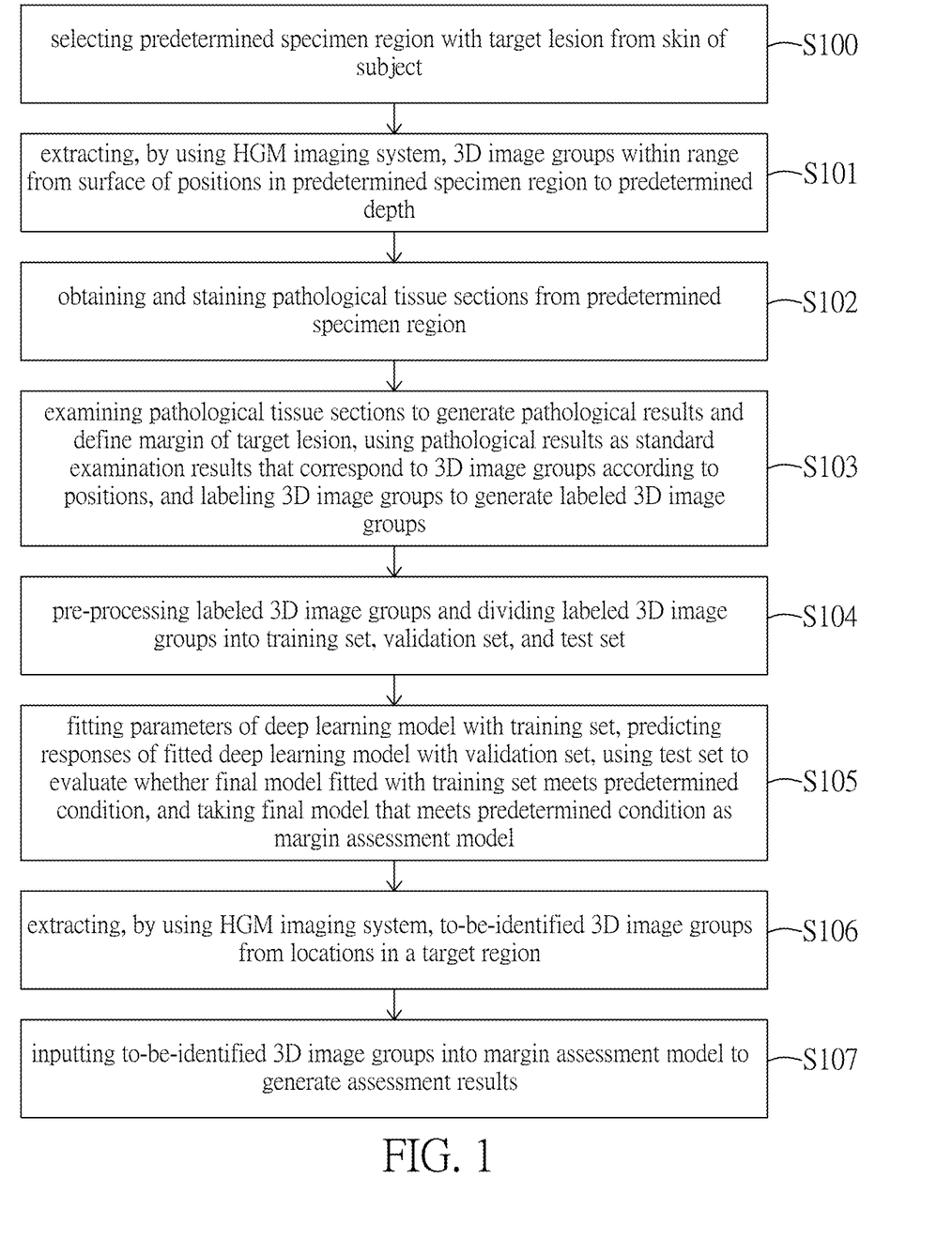
FIG. 1 is a flowchart of a margin assessment method according to one embodiment of the present disclosure.

FIG. 1 is a flowchart of a margin assessment method according to one embodiment of the present disclosure.

Referring to FIG. 1, an embodiment of the present disclosure provides a margin assessment method, which includes steps as follows.

Step S100: selecting a predetermined specimen region with a target lesion from a skin of a subject. For example, the predetermined specimen region can be an ex vivo surgical sample taken from an Extramammary Paget's disease (EMPD) lesion, and step S101 is performed immediately after the ex vivo surgical sample is taken.

Step S101: extracting, by using a harmonic generation microscopy (HGM) imaging system, a plurality of 3D image groups within a range from a surface of a plurality of positions in the predetermined specimen region to a predetermined depth.

Figure 2:
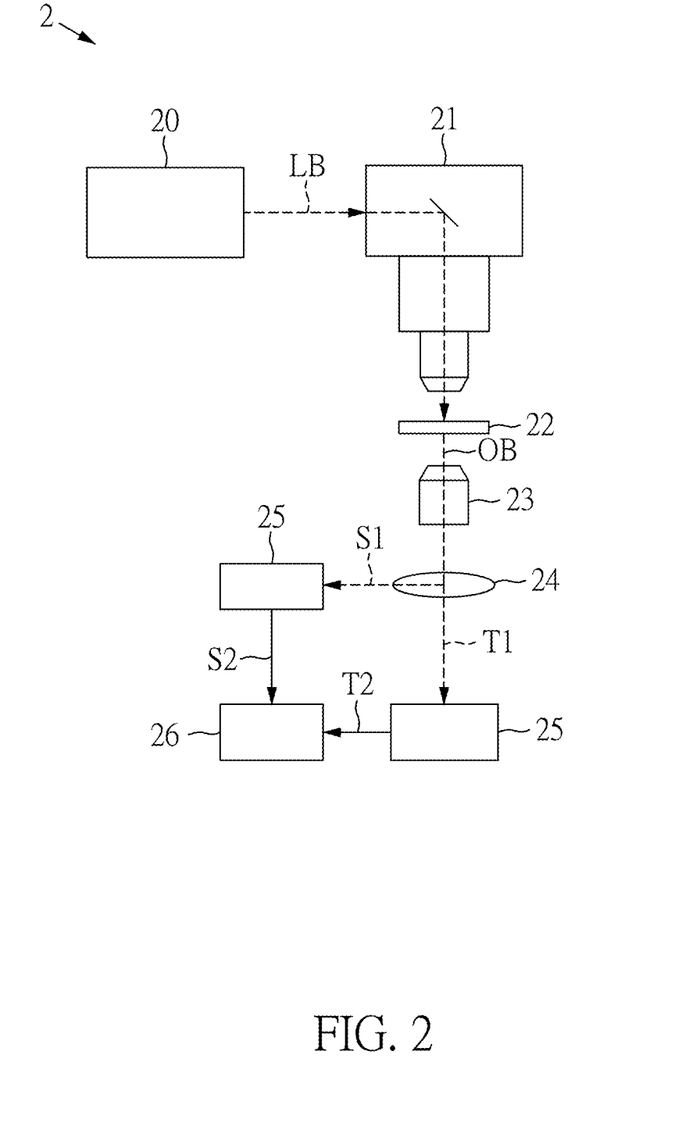
FIG. 2 is a schematic diagram of an architecture of an HGM imaging system according to one embodiment of the present disclosure.

FIG. 2 is a schematic diagram of an architecture of an HGM imaging system according to one embodiment of the present disclosure.

As shown in FIG. 2, an HGM imaging system 2 uses a laser device 20 to emit a laser beam LB that is within a given wavelength range and does not cause an autofluorescence reaction on biological samples, and a second harmonic generation (SHG) light and a third harmonic generation (THG) light are generated after excitation of the laser device 20. Then, the laser beam LB is projected by a microscope device 21 onto a sample 22 that is to be inspected, and an observation beam OB that passes through the sample 22 is received. The observation beam OB is converged by a condenser 23, and is guided through a beam splitting device 24 that separates the observation beam OB into an SHG beam S1 and a THG beam T1. The SHG beam S1 and the THG beam T1 are received by a light sensing circuit 25 (shown as two parts in FIG. 2), and the two are then converted into a corresponding SHG signal S2 and a corresponding THG signal T2, which are sent to a computing device 26 for processing, so as to form related SHG images and THG images. It should be noted that the HGM imaging system shown in FIG. 2 is only a schematic illustration of its architecture. Although an optical reflective architecture is omitted, the HGM imaging system can be a reflective HGM imaging system.

The computing device 26 can at least include a processor, a memory, and a communication module. The computing device 26 can be, for example, a general-purpose computer or server. The processor is, for example, a central processing unit (CPU), a programmable general-purpose or special-purpose microprocessor, a digital signal processor (DSP), a programmable controller, an application specific integrated circuit (ASIC), a programmable logic device (PLD), a graphics processing unit (GPU), or any other similar devices or a combination of these devices.

The memory can be used to store images, program codes, software modules, and other data. The memory can be, for example, any type of fixed or removable random-access memory (RAM), read-only memory, flash memory, hard disk or other similar devices, integrated circuits and combinations thereof.

The communication module can be, for example, a wireless communication module that supports various short-range or long-range communications (such as a wireless communication module that supports WI-FI, BLUETOOTH, and other specifications). The communication module can also be a wired communication module, such as a network card that supports an Ethernet interface. The communication module is mainly used to communicate with the light sensing circuit 25.

Therefore, the 3D image groups generated in step S101 are a plurality of dual-channel image groups, each of which includes multiple SHG images and multiple THG images. It should be noted that the laser device 20 can use, for example, a Cr:Forsterite laser, and is capable of producing 38 femtosecond pulses with a repetition rate of 105 MHz at a central wavelength of 1262 nm (bandwidth: 91 nm). The laser device 20 is adjusted to irradiate with appropriate power, so as to avoid damage to the sample 22 by the laser beam.

Each 3D image group is composed of a series of 2D en face images, and is 512×512 pixels under 235 μm×235 μm field of view. Each 3D image group is acquired from the skin surface to a depth of 180 μm. In detail, "from the surface to the predetermined depth" mentioned in step S101 refers to a depth from the stratum corneum or below (or the granular layer) to the dermis. In the present disclosure, the predetermined depth is not limited to the above-mentioned 180 μm.

Step S102: obtaining and staining a plurality of pathological tissue sections from the predetermined specimen region.

After the HGM imaging in step S101, skin biopsy samples are fixed in 10% formalin, embedded in paraffin, cut into 10-micron sections, and stained with hematoxylin and eosin (H&E) stain.

Step S103: examining the plurality of pathological tissue sections to generate a plurality of pathological results and define a margin of the target lesion, using the plurality of pathological results as a plurality of standard examination results that correspond to the 3D image groups according to the plurality of positions, and labeling the 3D image groups to generate a plurality of labeled 3D image groups. For example, the labeling can be performed by the computing device 26 and stored in the memory.

In this step, histopathological features of the H&E sections are reviewed by a dermatopathologist, and borders between normal and EMPD lesions are identified on stitched microscopic photos.

Figure 3:
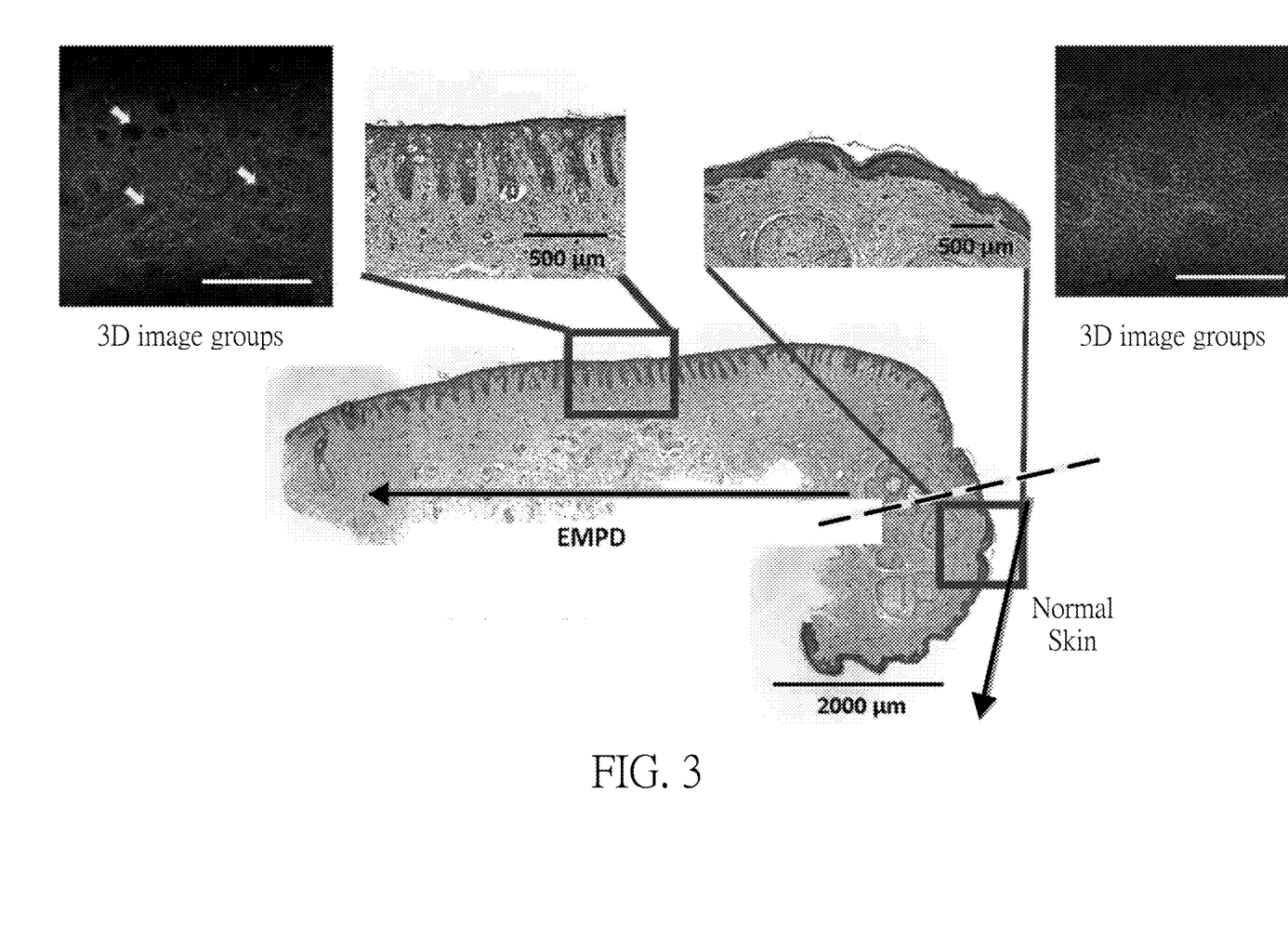
FIG. 3 is a schematic diagram showing clinical diagnosis results of H&E stained histopathological sections being mapped to a three-dimensional image group according to one embodiment of the present disclosure.
Figure 4:
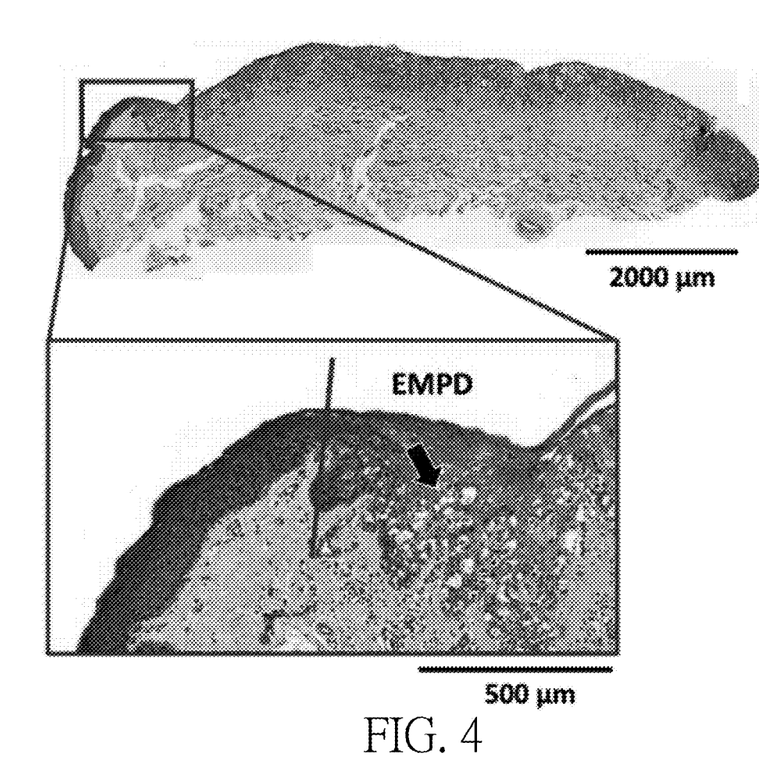
FIG. 4 is a detailed schematic diagram of EMPD tissue and normal skin tissue in the H&E stained histopathological sections according to one embodiment of the present disclosure.

According to the positions, the results of H&E stained histopathological sections are taken as the standard examination results to be mapped to the 3D image groups, so as to label each 3D image group as EMPD lesions or normal skin, as shown in FIGS. 3 and 4. FIG. 3 is a schematic diagram showing clinical diagnosis results of H&E stained histopathological sections being mapped to a three-dimensional image group according to one embodiment of the present disclosure. FIG. 4 is a detailed schematic diagram of EMPD tissue and normal skin tissue in the H&E stained histopathological sections according to one embodiment of the present disclosure.

In FIGS. 3 and 4, the H&E stained histopathological sections of EMPD show that tumor cells (Paget's cells) in the epidermis have abundant pale cytoplasm and are distributed in isolated forms or in clusters. Compared with the surrounding normal cells, the epidermis of EMPD lesions is often acanthotic and hyperkeratotic.

In an HGM imaging approach, an SHG part is a depth indicator and can thus differentiate an in-situ tumor from an infiltrative skin tumor. On the other hand, THG can distinguish the tumor cells from the normal cells since the EMPD lesion is characterized by round-shaped and dark cells. Therefore, both SHG and THG can be used as indicators that represent the different characteristics of EMPD, and can provide valuable supplemental information for identifying the lesion and its margin in EMPD diagnostics.

Step S104: pre-processing the plurality of labeled 3D image groups and dividing the plurality of labeled 3D image groups into a training set, a validation set, and a test set. This step can be performed by the computing device 26.

In the embodiment of the present disclosure, in order to reach a faster and better training result, an image pre-processing procedure is performed to resize images by down-scaling the original 512×512×96 pixels into 64×64×32 pixels.

In one embodiment of the present disclosure, a total of 2286 3D image groups are adopted as a dataset, which includes 1325 EMPD image groups and 961 normal image groups. After adjusting the size of each image group, the 3D image groups are randomly divided into the training set, the validation set and the test set for training, verification and testing, the proportions of which can be 83.3%, 8.3%, and 8.3% (a ratio of 10:1:1).

Step S105: fitting parameters of a deep learning model with the training set, predicting responses of the fitted deep learning model with the validation set, using the test set to evaluate whether a final model fitted with the training set meets a predetermined condition, and taking the final model that meets the predetermined condition as a margin assessment model. This step can be performed by the computing device 26.

The following descriptions illustrate the deep learning model adopted by the present disclosure.

Figure 5:
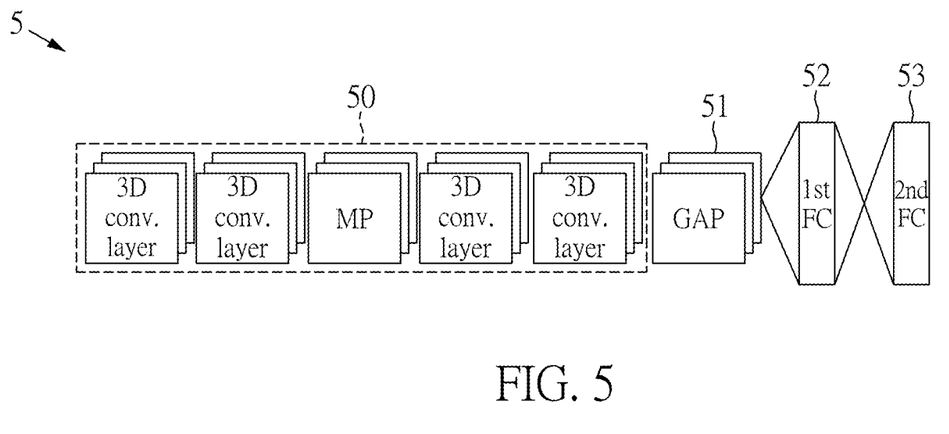
FIG. 5 is a structural diagram of one deep learning model according to one embodiment of the present disclosure.

Reference is made to FIG. 5, which is a structural diagram of one deep learning model according to one embodiment of the present disclosure.

As shown in FIG. 5, a deep learning model 5 includes a first Models Genesis encoder 50, a first global average pooling (GAP) layer 51, a first fully-connected (FC) layer 52, and a second FC layer 53.

In detail, the settings of the first Models Genesis encoder 50 are based on Models Genesis provided in "Models Genesis: Generic Autodidactic Models for 3D Medical Image Analysis" published by Zhou, Zongwei, et al. in International Conference on Medical Image Computing and Computer-Assisted Intervention (Springer, Cham, 2019). Models Genesis is a powerful three-dimensional pre-training model. Models Genesis significantly outperforms other models in both segmentation and classification of several major 3D medical image applications. In this embodiment, a small amount of the 3D image groups is used for training, and the existing Models Genesis is fine-tuned to provide a better performance than other 2D models. In other words, the trained deep learning model 5 can be regarded as a 3D intelligence model, which can perform margin assessment of skin diseases based on the input non-invasive real-time information and the depth information of skin diseases.

To avoid over-fitting issues, in the present disclosure, an architecture of the pretrained model is shrunk and then modified with additional layers. The model is also fine-tuned with weights from the pretrained Models Genesis. Therefore, as shown in FIG. 5, the first Models Genesis encoder 50 is an encoder portion of the trained Models Genesis model, and a plurality of initial weights of the trained Models Genesis model are used. The complete architecture of the pre-trained Models Genesis will not be reiterated herein. The first Models Genesis encoder 50 is configured according to the encoder part of the Models Genesis, and includes a plurality of 3D convolutional layers and a plurality of maximum pooling (MP) layers.

It should be noted that the deep learning model 5 in FIG. 5 is a single-path model. Compared with the 3D image groups which are essentially dual-channel image groups, a dual-path model can be further considered.

Figure 6:
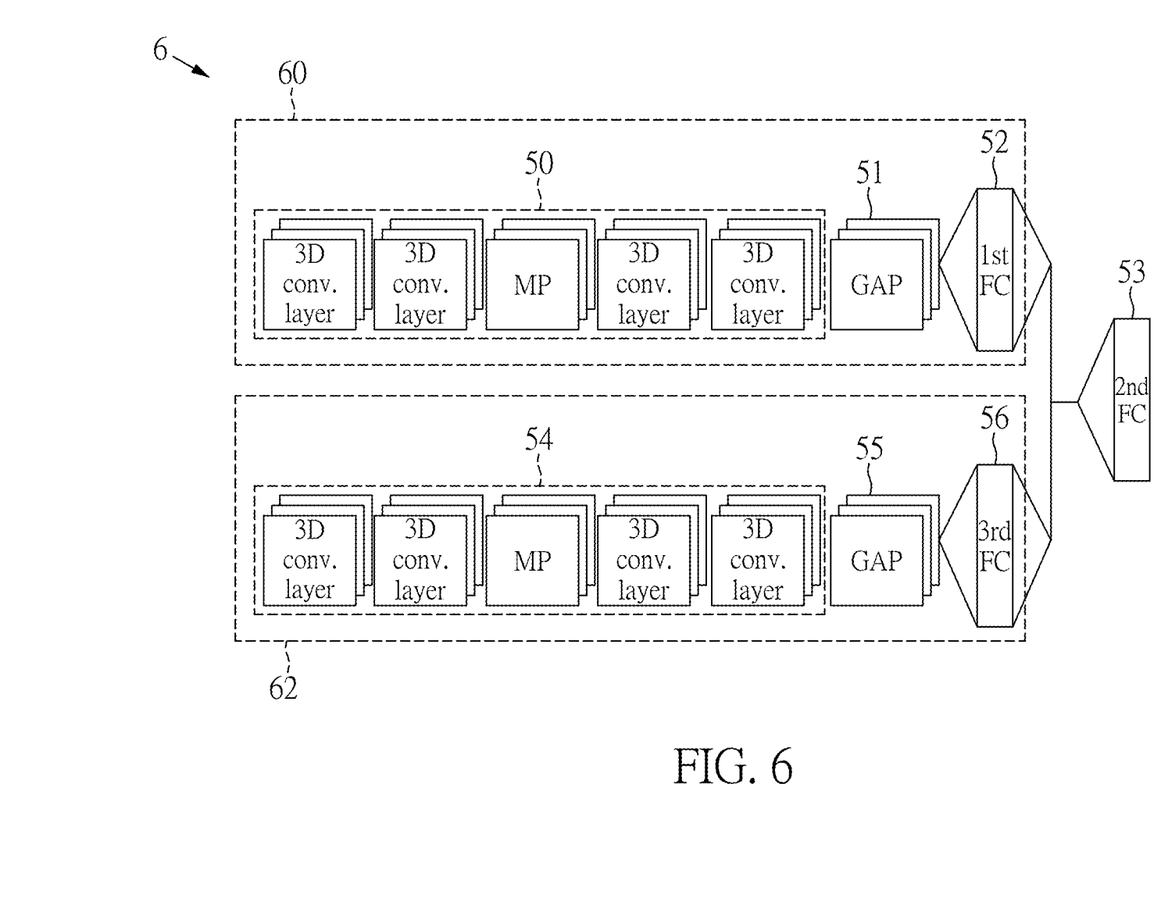
FIG. 6 is a structural diagram of another deep learning model according to one embodiment of the present disclosure.

Reference is made to FIG. 6, which is a structural diagram of another deep learning model according to one embodiment of the present disclosure. As shown in FIG. 6, the first Models Genesis encoder 50, the first GAP layer 51, and the first FC layer 52 form a first path model 60, which is connected to the second FC layer 53.

In addition, a deep learning model 6 includes a first path model 60 and a second path model 62. The second path model 62 includes a second Models Genesis encoder 54, a second GAP layer 55 and a third FC layer 56. The second path model 62 is connected to the second FC layer 53. The second Models Genesis encoder 54 is also taken from the encoder part of the trained Models Genesis, and includes a plurality of 3D convolutional layers and a plurality of MP layers.

Then, the aforementioned deep learning models 5 and 6 are trained with the previously divided training set. In a specific embodiment, the deep learning models 5 and 6 are trained for 300 epochs with an early stopping of 50 epochs. In other words, the overfitting issues are prevented by stopping training after a number of 50 epochs without a decrease in the validation loss.

As mentioned above, the first Models Genesis encoder 50 and the second Models Genesis encoder 54 are extracted from the encoder part of the existing Models Genesis. Therefore, initial weights of the first Models Genesis encoder 50 and the second Models Genesis encoder 54 are also adopted from the pre-trained Models Genesis.

All of the 3D convolutional layers apply a rectified linear unit (ReLU) and are regularized by using batch normalization. One 3D global average pooling layer is applied after the last convolution, and dropout is applied to the MP layers, the GAP layers and the two FC layers.

In addition, in the first FC layer 52 and the third FC layer 56, a scaled exponential linear unit (SELU) excitation function and a LeCun normal kernel initializer are applied. In the second FC layer, a Sigmoid activation and L2 regularization are applied for binary classification.

Next, network optimization is performed by using the Adam optimization algorithm with a batch size of 18, and binary cross-entropy is used as a loss term in a cost function.

In the present disclosure, to prove that fine-tuning from the pre-trained model provides a better performance, a simple 3D convolution neural network (CNN) model is trained from scratch. After training, a comparison with a control group of fine-tuning from the pre-trained model is shown in Table 1:

TABLE 1

| | Loss | Sensitivity (%) | Specificity (%) | Accuracy (%) |
|---|---|---|---|---|
| Scratch from a 3D CNN model | 0.5579 | 97.09 | 37.50 | 74.25 |
| Finetune from a pretrained model | 0.1781 | 98.05 | 90.63 | 95.21 |

It can be seen from Table 1 that fine-tuning from the pre-trained model can achieve better sensitivity, specificity and accuracy.

Furthermore, as mentioned above, the HGM imaging system produces dual-channel image groups, which include SHG images and THG images. Therefore, in the embodiment of the present disclosure, three different designs are adopted. Model No. 1 has two separate channels for the SHG image and the THG image, and uses the dual-path network of FIG. 6. Model No. 2 has a combined channel for the SHG image and THG image, and uses the single-path network of FIG. 5. Model No. 3 merely uses the THG images and the single-path network of FIG. 5.

For Model No. 1, an SHG part of the training set, the validation set, and the test set is applied to the first path model 60, and a THG part of the training set, the validation set, and the test set is applied to the second path model 62.

After these three models are trained, the results are shown in Table 2:

TABLE 2

| | Loss | Sensitivity (%) | Specificity (%) | Accuracy (%) |
|---|---|---|---|---|
| Model No. 3 | 0.2396 | 90.29 | 89.06 | 89.82 |
| Model No. 2 | 0.2302 | 95.15 | 87.50 | 92.22 |
| Model No. 1 | 0.1781 | 98.05 | 90.63 | 95.21 |

As shown in Table 2 above, it can be seen that Model No. 1 yields the best results. The reason is that both SHG and THG images are important but different, and need to be analyzed separately to obtain a correct EMPD diagnosis. Accordingly, a clear dermal-epidermal junction (DEJ) can be seen in the analysis results. However, even Model No. 3 with lower accuracy can still achieve an accuracy of about 89%.

Therefore, after step S105, the final model that meets the predetermined condition is used as a margin assessment model.

Step S106: extracting, by using the HGM imaging system, a plurality of to-be-identified 3D image groups from a plurality of locations in a target region. Similarly, in this step, each of the to-be-identified 3D image groups includes a plurality of 2D images, and includes SHG images and THG images.

Step S107: inputting the to-be-identified 3D image groups into the margin assessment model to generate assessment results.

In detail, if the model shown in FIG. 5 is used, the 3D image group to be identified that only includes THG images, or the 3D image group to be identified that combines SHG images and THG images, can be input according to the training method.

If the model of FIG. 6 is used, the SHG parts of the to-be-identified 3D image groups can be input into the first path model 60, and the THG parts can be input into the second path model 62, so as to generate the assessment results. The generated assessment results can assist a user in providing an accurate margin assessment of the target lesion.

In conclusion, the margin assessment method provided by the present disclosure combines the nonlinear harmonic generation microscopy (HGM) with the deep learning method, so as to instantaneously and digitally determine whether the 3D image group generated by using the HGM is malignant EMPD or the surrounding normal skin. To demonstrate the margin assessment method provided by the present disclosure, in the embodiments of the present disclosure, 3D imaging of different locations of fresh EMPD surgical samples is performed from the surface to a depth of 180 μm by using a stain-free HGM. In the present disclosure, by conducting a subsequent histopathological examination of the same sample, the standard examination results are mapped to the 3D HGM image groups with labels, so as to train the deep learning model.

In the embodiments of the present disclosure, 2095 3D image groups are used as the training set and the validation set, and results of an EMPD and normal skin tissue classification can achieve 98.06% of sensitivity, 93.18% of specificity, and 95.81% of accuracy. Therefore, in the margin assessment method of the present disclosure, non-invasive real-time information of an imaged part can be provided, and the non-invasive real-time information is input into a trained 3D artificial intelligence model to indicate whether the imaged part is malignant or normal skin tissue based on the 3D image group and depth information of skin diseases, thereby assisting a user to map the EMPD margins with high accuracy.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A margin assessment method, comprising:
    selecting a predetermined specimen region with a target lesion from a skin of a subject;
    extracting, by using a harmonic generation microscopy (HGM) imaging system, a plurality of 3D image groups within a range from a surface of a plurality of positions in the predetermined specimen region to a predetermined depth, wherein each of the 3D image groups includes a series of a plurality of 2D images;
    obtaining and staining a plurality of pathological tissue sections from the predetermined specimen region;
    examining the plurality of pathological tissue sections to generate a plurality of pathological results and define a margin of the target lesion, using the plurality of pathological results as a plurality of standard examination results that correspond to the 3D image groups according to the plurality of positions, and labeling the 3D image groups to generate a plurality of labeled 3D image groups;
    pre-processing the plurality of labeled 3D image groups and dividing the plurality of labeled 3D image groups into a training set, a validation set, and a test set;
    fitting parameters of a deep learning model with the training set, predicting responses of the fitted deep learning model with the validation set, and then using the test set to evaluate whether a final model fitted with the training set meets a predetermined condition, wherein the final model that meets the predetermined condition is taken as a margin assessment model;
    extracting, by using the HGM imaging system, a plurality of to-be-identified 3D image groups from a plurality of locations in a target region; and
    inputting the to-be-identified 3D image groups into the margin assessment model to generate assessment results.

2. The margin assessment method according to claim 1, wherein the step of using the HGM imaging system to extract the 3D image groups includes:
    using a laser device to emit a laser beam with a predetermined wavelength;
    using a microscope device to project the laser beam onto a target position of the plurality of positions, so as to generate an observation beam that includes a second harmonic generation (SHG) beam and a third harmonic generation (THG) beam;
    splitting the SHG beam and the THG beam; and
    using a light sensing circuit to receive the SHG beam and the THG beam, and to respectively convert the SHG beam and the THG beam, so as to generate an SHG image and a THG image,
    wherein the 3D image groups are a plurality of dual-channel image groups, each of which includes multiple ones of the SHG image and multiple ones of the THG image.

3. The margin assessment method according to claim 2, wherein the deep learning model includes a first Models Genesis encoder, a first global average pooling layer, a first fully-connected layer, and a second fully-connected layer.

4. The margin assessment method according to claim 3, wherein the first Models Genesis encoder is an encoder portion of a trained Models Genesis model, and uses a plurality of initial weights of the trained Models Genesis model.

5. The margin assessment method according to claim 3, wherein the first Models Genesis encoder includes a plurality of 3D convolutional layers and a maximum pooling layer.

6. The margin assessment method according to claim 3, wherein the step of pre-processing the plurality of labeled 3D image groups and dividing the plurality of labeled 3D image groups into the training set, the validation set, and the test set further includes obtaining only a part of the plurality of dual-channel image groups that corresponds to a THG, and dividing the part into the training set, the validation set and the test set.

7. The margin assessment method according to claim 3, wherein the deep learning model includes a second Models Genesis encoder, a second global average pooling layer, and a third fully-connected layer;
    wherein the first Models Genesis encoder, the first global average pooling layer, and the first fully-connected layer form a first path model, which is connected to the second fully-connected layer,
    wherein the second Models Genesis encoder, the second global average pooling layer, and the third fully-connected layer form a second path model, which is connected to the second fully-connected layer.

8. The margin assessment according to claim 7, wherein an SHG part of the training set, the validation set, and the test set is used for the first path model, and a THG part of the training set, the validation set, and the test set is used for the second path model.

9. The margin assessment method according to claim 8, wherein each of the first Models Genesis encoder and the second Models Genesis encoder is an encoder portion of a trained Models Genesis model, and uses a plurality of initial weights of the trained Models Genesis model.

10. The margin assessment method according to claim 8, wherein the step of inputting the to-be-identified 3D image groups into the margin assessment model to generate the assessment results further includes inputting an SHG part of the to-be-identified 3D image groups into the first path model of the margin assessment model, and inputting a THG part of the to-be-identified 3D image groups into the second path model of the margin assessment model, so to generate the assessment results.

* * * * *